March 17, 1936. W. H. BAIN 2,033,972
INSOLE AND PROCESS OF MAKING SHOES THEREWITH
Filed Sept. 2, 1933 2 Sheets-Sheet 1
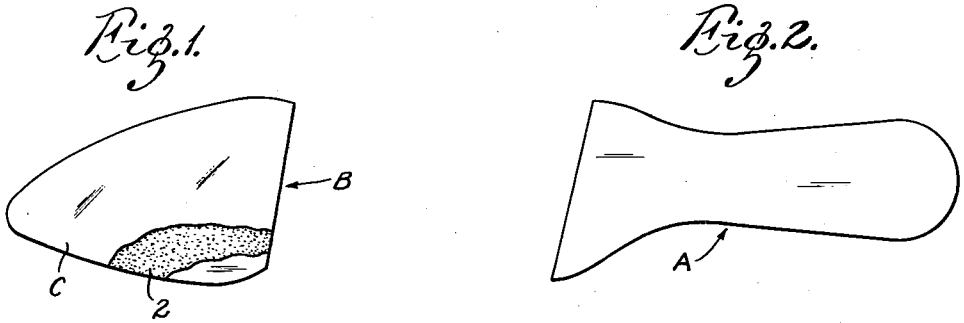
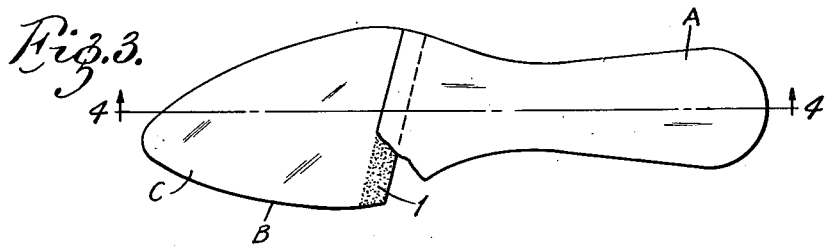
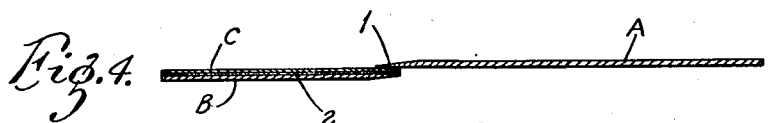
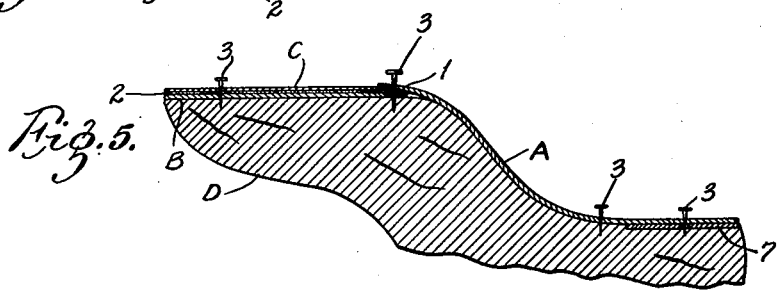
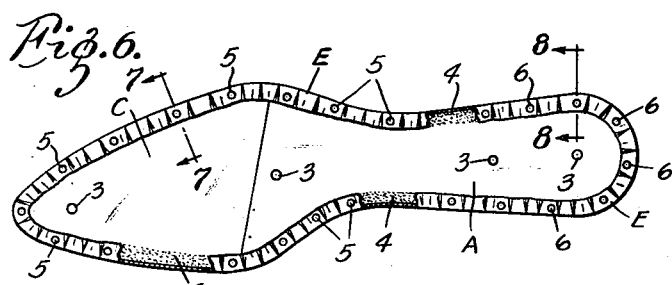
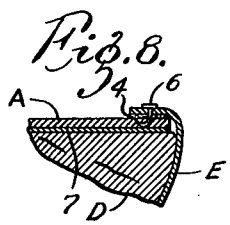
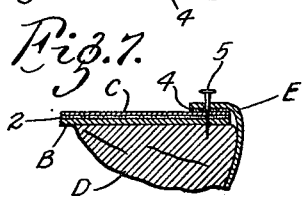
INVENTOR:
William H. Bain
by Cavett Cavett Knowly
HIS ATTORNEYS

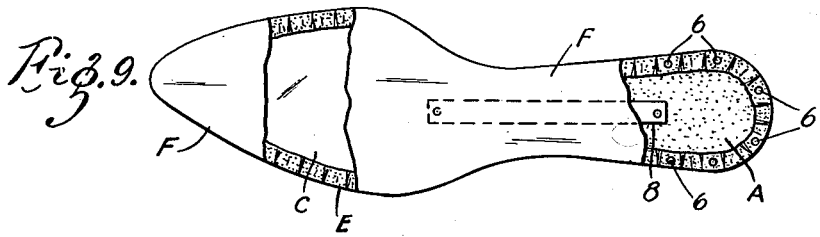
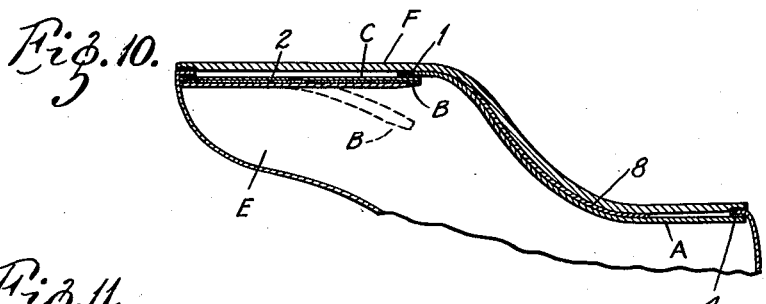
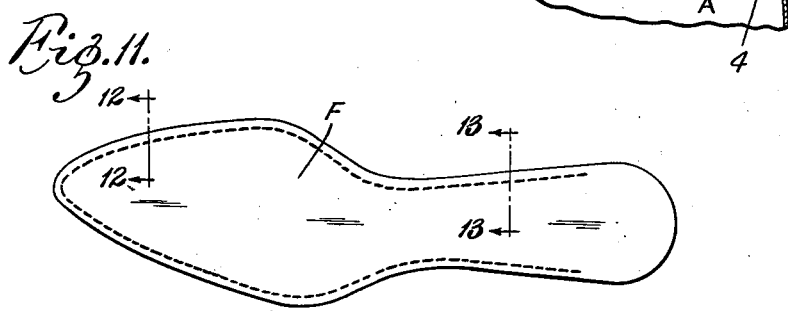
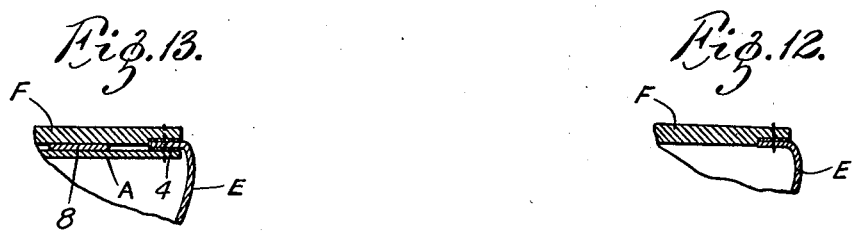
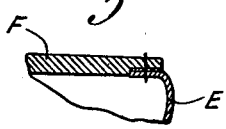
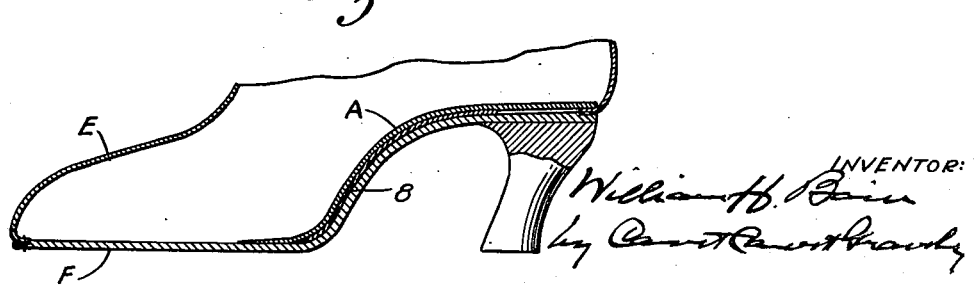

Patented Mar. 17, 1936

2,033,972

UNITED STATES PATENT OFFICE 2,033,972

INSOLE AND PROCESS OF MAKING SHOES THEREWITH

William H. Bain, Portsmouth, Ohio

Application September 2, 1933, Serial No. 687,938

6 Claims. (Cl. 12—142)

This invention relates to the manufacture of shoes, particularly shoes without an insole in the forepart thereof.

The principal objects of the present invention are to devise means for holding the forepart of the upper of such shoes to shape during the lasting operation and to simplify the manufacturing operation. The invention consists principally in the insole and in the method hereinafter described and claimed of making shoes therewith.

In the accompanying drawings, which form part of this specification and wherein like symbols refer to like parts wherever they occur.

Figs. 1 and 2 are, respectively, a bottom view of the removable forepart of the insole partly broken away, and a bottom view of the shank part of said insole, Fig. 3 is a bottom plan view showing the forepart of the insole temporarily cemented to the shank part of the insole and the shank part partly broken away, Fig. 4 is a longitudinal section through the insole on the line 4—4 in Fig. 3, Fig. 5 is a longitudinal section showing the insole tacked to the bottom of the last after being molded to conform to the surface thereof, Fig. 6 is a plan view showing the upper lasted to the insole, the upper being partly broken away, Fig. 7 is a vertical cross-section on the line 7—7 in Fig. 6, Fig. 8 is a vertical cross-section on the line 8—8 in Fig. 6, Fig. 9 is a view similar to Fig. 6 showing the lasting tacks pulled, the metal shank stiffener applied and the outsole laid, parts of the outsole being shown broken away, Fig. 10 is a longitudinal section through the shoe showing the same removed from the last, the fiber forepart being shown in dotted lines as partly removed from the shoe, Fig. 11 is a bottom plan view of the shoe showing the outsole stitched to the insole and upper, Fig. 12 is a transverse section through the forepart of the shoe on the line 12—12 of Fig. 11, Fig. 13 is a similar section through the shank portion of the shoe on the line 13—13 of Fig. 11; and Fig. 14 is a longitudinal section through the shoe after the attachment of the outsole and heel and the removal of the temporary forepart of the insole.

Referring to the accompanying drawings, an insole used with the process of manufacturing shoes without an insole in the forepart thereof comprises a shank piece A of ordinary insole leather or other suitable material and a forepart B of relatively thin material, such as fiber, that is relatively thin and stiff and has a relatively high tensile strength. The leather shank piece A and forepart B have their adjacent ends overlapped and removably secured together, preferably by means of a light holding cement 1. If desired, however, the shank piece and forepart may be removably secured together by wire staples or by stitching. The outer or lasting side of the fiber forepart B is covered with a thin material C, such as tissue paper, which is secured to said forepart preferably by means of a light holding cement 2 that permits the forepart and tissue paper covering therefor to be readily separated.

In the process of manufacturing a shoe with the insole hereinbefore described, said insole, after being molded to conform to the bottom surface of the last D, is temporarily secured by tacks 3 to the bottom of said last with the tissue paper covering C disposed uppermost. The upper E is then pulled over the last, and secured by cement 4 and tacks 5 and 6 to the leather shank piece A and to the tissue paper covering C of the fiber forepart B. The tacks 5, which secure the front lasting allowance of the upper, are driven only part way into the last, while the tacks 6, which secure the heel lasting allowance of the upper, are clinched on a metal plate 7 mounted on the inner face of the shank piece by means of the usual heel plate fixed to the bottom of the last. The usual metal shank stiffener 8 is then tacked to the inner face of the shank piece. After the cement 4 has set, the tacks 3 and 5 are pulled and the shoe is then prepared for the outsole. The outsole F is laid, the last D pulled, the fiber forepart B removed from the shoe and the outsole is then sewed to the upper E and shank piece A. In the manufacture of cement process shoes, the outsole is cemented to the upper and insole and the fiber forepart is removed after the last is pulled. The light holding cement 2 tends to permit the fiber to be readily separated from the tissue paper covering therefor. However, in the event of failure of the fiber and tissue paper to separate, the tissue paper will tear away with the fiber piece and be removed therewith from the shoe.

The thin, stiff fiber forepart of the insole serves to hold the upper in place until the outsole is secured in position; and the tissue paper covering for said forepart prevents the cement that secures the upper to said forepart from coming in direct contact therewith and thus rendering difficult the removal thereof. In cases where the bottom of the forepart of the last is too low, a fiber forepart of the desired thickness may be used to build up the last to the level required.

Obviously, the invention is not limited to the particular details hereinbefore described. For instance, while the insole above described is preferably made and handled as a separate article of manufacture, it may, however, be made and embodied in the shoe in a continuous operation. In such case, the leather shank piece and the fiber forepart are not secured together but are attached separately to the last. Likewise, while it is preferable to cement the upper to the tissue paper covering of the fiber forepart, it may be desirable to dispense with the tissue paper covering and secure the upper directly to the fiber forepart by means of a paste or cement which, after a time, loses its adhesive qualities and thus permits the removal of said fiber forepart.

What I claim is:

1. An insole for shoes without an insole in the forepart thereof comprising a shank piece, a detachable forepart, and a tissue paper covering for the outer face of said detachable forepart.

2. An insole for shoes without an insole in the forepart thereof comprising a shank piece, a detachable forepart of relatively thin, stiff material, and a covering of tissue paper detachably secured to the outer face of said forepart.

3. An insole comprising a shank piece, a fiber forepart, a tissue paper covering for the outer face of said forepart, means temporarily securing said tissue paper covering to the outer face of said forepart, and means temporarily securing said forepart to said shank piece.

4. The process of making shoes without an insole in the forepart thereof, which consists in placing on a last an insole comprising a shank piece, a forepart detachably secured to said shank piece, and a covering of tissue paper detachably secured to the outer face of said forepart, cementing a shoe upper to said shank piece and said covering and removing said forepart.

5. The process of making shoes without an insole in the forepart thereof which comprises placing on a last an insole consisting of a shank piece and a fiber forepart having their ends overlapped and temporarily secured together, said forepart being of a width corresponding to the full width of the portion of the last bottom engaged thereby, lightly cementing a shoe upper to said shank piece and said forepart of said insole and afterwards removing said forepart.

6. The process of making shoes without an insole in the forepart thereof which comprises placing on a last an insole consisting of a shank piece and a forepart having their ends overlapped and temporarily secured together, said forepart being made of a relatively thin and stiff material having a high resistance to tearing and buckling, lightly cementing the forepart of a shoe upper to said forepart of said insole and afterwards removing the entire forepart.

WILLIAM H. BAIN.